(12) United States Patent
Lai et al.

(10) Patent No.: US 9,890,843 B2
(45) Date of Patent: Feb. 13, 2018

(54) ALL-TERRAIN VEHICLE AND TRANSMISSION MECHANISM THEREOF

(71) Applicant: Zhejiang CFMOTO Power Co., Ltd., Hangzhou, Zhejiang Province (CN)

(72) Inventors: Minjie Lai, Zhejiang (CN); Zhangping Yuan, Zhejiang (CN); Fuying Cheng, Zhejiang (CN); Zhenxiang Kuang, Zhejiang (CN)

(73) Assignee: Zhejiang CFMOTO Power Co., Ltd., Hangzhou, Zhejiang Province (CN)

( * ) Notice: Subject to any disclaimer, the term of this patent is extended or adjusted under 35 U.S.C. 154(b) by 0 days.

(21) Appl. No.: 15/288,215

(22) Filed: Oct. 7, 2016

(65) Prior Publication Data
US 2017/0356537 A1 Dec. 14, 2017

(30) Foreign Application Priority Data
Jun. 8, 2016 (CN) ...................... 2016 2 0555593 U

(51) Int. Cl.
*B60K 1/00* (2006.01)
*F16H 48/12* (2012.01)

(52) U.S. Cl.
CPC .................................... *F16H 48/12* (2013.01)

(58) Field of Classification Search
CPC ................ B60K 7/0007; B60K 17/046; B60K 2007/0046; B60K 2007/0061; B60L 2220/46; Y02T 10/725
(Continued)

(56) References Cited

U.S. PATENT DOCUMENTS 4,437,530 A * 3/1984 De Young ............... B60B 11/06
                                                        180/372
5,419,406 A * 5/1995 Kawamoto ............... B60K 1/02
                                                        180/60
(Continued)

FOREIGN PATENT DOCUMENTS

CN          200918937 Y       11/2007
CN          101871529 A       10/2010

OTHER PUBLICATIONS

First Office Action for Chinese Application No. CN 201620555593.2 dated Oct. 11, 2016.
(Continued)

*Primary Examiner* — Toan To
(74) *Attorney, Agent, or Firm* — Wolf, Greenfield & Sacks, P.C.

(57) ABSTRACT

A transmission mechanism of an all-terrain vehicle is provided, which includes an independent suspension axle. The independent suspension axle includes a left driving half-axle and a right driving half-axle. A jaw differential is provided at a joint of the left driving half-axle and the right driving half-axle and is configured to allow half-axles at two sides to rotate at different speeds when the axle of the all-terrain vehicle transmits power to the half-axles at the two sides, and prevent a wheel at one side from slipping. For the all-terrain vehicle adopting the jaw differential, side tipping, side slipping, and tire scuffing are not apt to occur, thus the vehicle may get rid of stuck conditions such as slipping, and the working reliability of the all-terrain vehicle is improved. An all-terrain vehicle adopting the transmission mechanism is further provided.

6 Claims, 4 Drawing Sheets

(58) Field of Classification Search
USPC ......... 180/65.1, 65.22, 65.51, 65.6, 63, 372, 180/376, 379
See application file for complete search history.

(56) References Cited

U.S. PATENT DOCUMENTS

| | | | | |
|---|---|---|---|---|
| 5,443,130 | A * | 8/1995 | Tanaka | B60K 1/00 180/65.6 |
| 5,919,109 | A * | 7/1999 | Fleckenstein | B60K 17/046 475/151 |
| 6,092,439 | A | 7/2000 | Tyson et al. | |
| 8,640,801 | B2 * | 2/2014 | Hennings | B60K 7/0007 180/65.6 |
| 9,387,756 | B1 * | 7/2016 | Whiting | B60K 6/52 |
| 9,630,488 | B2 * | 4/2017 | Koenig | B60K 7/0007 |
| 2009/0014223 | A1 * | 1/2009 | Jones | B60K 17/16 180/65.8 |
| 2012/0318629 | A1 | 12/2012 | Lyman | |
| 2013/0041566 | A1 * | 2/2013 | Gagnon | B62K 5/01 701/70 |

OTHER PUBLICATIONS

European Search Report for Application No. EP 16 19 3150 dated Oct. 25, 2017.

* cited by examiner

ALL-TERRAIN VEHICLE AND TRANSMISSION MECHANISM THEREOF

CROSS REFERENCE OF RELATED APPLICATION

The present application claims the priority to Chinese Patent Application No. 201620555593.2, titled "ALL-TERRAIN VEHICLE AND TRANSMISSION MECHANISM THEREOF", filed on Jun. 8, 2016, with the Chinese State Intellectual Property Office, the content of which is hereby incorporated by reference to the maximum extent allowable by law.

FIELD

This application relates to the technical field of vehicles, and particularly to an all-terrain vehicle and a transmission mechanism thereof.

BACKGROUND

An all-terrain vehicle refers to a vehicle capable of running on any terrains and running freely on a terrain where an ordinary vehicle is difficulty driven. The all-terrain vehicle is commonly known as an ATV (all-terrain vehicle) in China. The all-terrain vehicle has a structure which is very similar to a motorcycle, and many components thereof can be used interchangeably with those of a motorcycle, thus the all-terrain vehicle is also called as quad bike. Such kind of vehicle has a variety of uses, and is not restricted by road conditions, thus is widely used in North America and Western Europe, and the used range shows an increasing trend year by year.

Reference is made to FIG. 1, which is a schematic view showing the structure of an axle of an all-terrain vehicle in the conventional technology.

As shown in FIG. 1, in the conventional technology, the axle of the all-terrain vehicle in the conventional technology includes a left half-axle 101 and a right half-axle 102, and the axle is not provided with any differential. Thus, the force outputted from the engine to the half-axles is distributed evenly to the half-axles at the two sides, to allow a left wheel and a right wheel respectively connected to the left half-axle 101 and the right half-axle 102 to travel at the same speed.

When the all-terrain vehicle turns a corner, a running distance of a wheel at the outer side is longer than a running distance of a wheel at the inner side; or when the all-terrain vehicle runs in a straight line on an uneven road, lengths of running curves of the wheels at the two sides are also different; or even if the road is very flat and straight, due to the size error of tires in manufacturing, different degrees of wear, different loads, or different inflation pressures of the tires, rolling radii of the tires are virtually impossible to be completely equal, and if the speeds of the wheels at the two sides are equal, the phenomenon that the wheel slips while rolling would inevitably occur, i.e., the tire at one side slips with respect to the tire at another side, which accelerates tire wear, and reduces the transmission efficiency.

In view of this, it is urgent to optimize the design of the axle of the all-terrain vehicle in the conventional technology to allow the half-axles at the two sides to rotate at different speeds when the axle of the all-terrain vehicle transmits power to the half-axles at the two sides, and prevent a wheel at one side from slipping.

SUMMARY

An object of the present application is to provide a transmission mechanism of an all-terrain vehicle, to allow the half-axles at the two sides to rotate at different speeds when the axle of the all-terrain vehicle transmits power to the half-axles at the two sides, and prevent a wheel at one side from slipping. Furthermore, another object of the present application is to provide an all-terrain vehicle using the above transmission mechanism.

To address the above technical issues, a transmission mechanism of an all-terrain vehicle is provided according to the present application, the transmission mechanism includes an axle, and the axle includes a left driving half-axle and a right driving half-axle, a jaw differential is further provided at a joint of the left driving half-axle and the right driving half-axle and is configured to allow the left driving half-axle and the right driving half-axle to rotate at a same speed when the vehicle travels in a straight line;

allow a wheel at one side which rotates fast to rotate timely and appropriately as required when the vehicle turns a corner;

allow a wheel at one side on the ground to always maintain a driving force, and a wheel at another side suspended in air to rotate at a same speed as the wheel at one side on the ground when the wheel at another side of the vehicle is suspended in the air; and allow the left driving half-axle and the right driving half-axle to return to the same rotating speed when the vehicle returns to running in a straight line.

For the all-terrain vehicle which travels on a road with a complex condition, after the vehicle employs the jaw differential of such a structure, side tipping is not apt to occur and the tire travels in the form of rolling when the vehicle turns a corner, thus, the vehicle may get rid of stuck conditions such as slipping, and the working reliability of the all-terrain vehicle is greatly improved.

Preferably, the jaw differential includes a left casing and a right casing, a drive ring, driven rings, a central ring and half-axle gears;

the drive ring is fixedly connected between the left casing and the right casing, and the central ring is nested and connected inside the drive ring, from a left side and a right side of the drive ring and the central ring, the drive ring and the central ring nested together, the driven rings and the half-axle gears are connected in the listed sequence; and an outer end surface of the driven ring is provided with two circles of teeth, outer circle teeth are configured to mesh with the drive ring by inverted trapezoidal gear teeth with a meshing clearance existing between meshed inverted trapezoidal gear teeth, and inner circle teeth are configured to mesh with the central ring by gear teeth with no meshing clearance existing between meshed gear teeth.

Preferably, an outward thrust ring is further provided between the drive ring and each of the driven rings.

Preferably, the drive ring and the central ring are connected as a whole by a snap ring.

Preferably, a spring reset mechanism is provided between the half-axle gear and the driven ring, and the spring reset mechanism includes a spring and a retainer ring.

An all-terrain vehicle is further provided according to the present application, which includes an engine and a transmission mechanism connected to the engine, and the transmission mechanism adopts the transmission mechanism described above.

Since the transmission mechanism has the above technical effects, the all-terrain vehicle including the transmission mechanism should also have the same technical effects, which are not described here.

Figure 1:
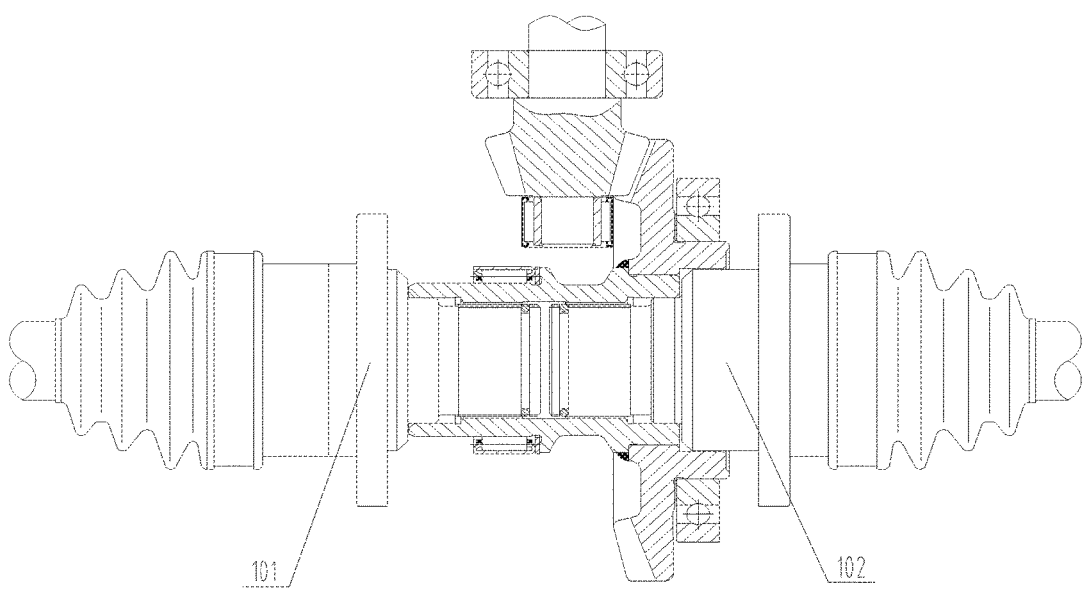
FIG. 1 is a schematic view showing the structure of an axle of an all-terrain vehicle in the conventional technology.

Reference numerals in FIGS. 1 to 5:

| 101 | left half-axle,   | 102 | right half-axle, |
|-----|-------------------|-----|------------------|
| 1   | casing,           | 2   | drive ring,      |
| 3   | driven ring,      | 4   | central ring,    |
| 5   | half-axle gear, and | 6 | spring.          |

DETAILED DESCRIPTION

An aspect of the present application is to provide a transmission mechanism of an all-terrain vehicle, to allow the half-axles at the two sides to rotate at different speeds when the axle of the all-terrain vehicle transmits power to the half-axles at the two sides, and prevent a wheel at one side from slipping. Furthermore, another aspect of the present application is to provide an all-terrain vehicle using the transmission mechanism.

For those skilled in the art to better understand technical solutions of the present application, the present application is further described in detail hereinafter in conjunction with the drawings and embodiments.

Figure 2:
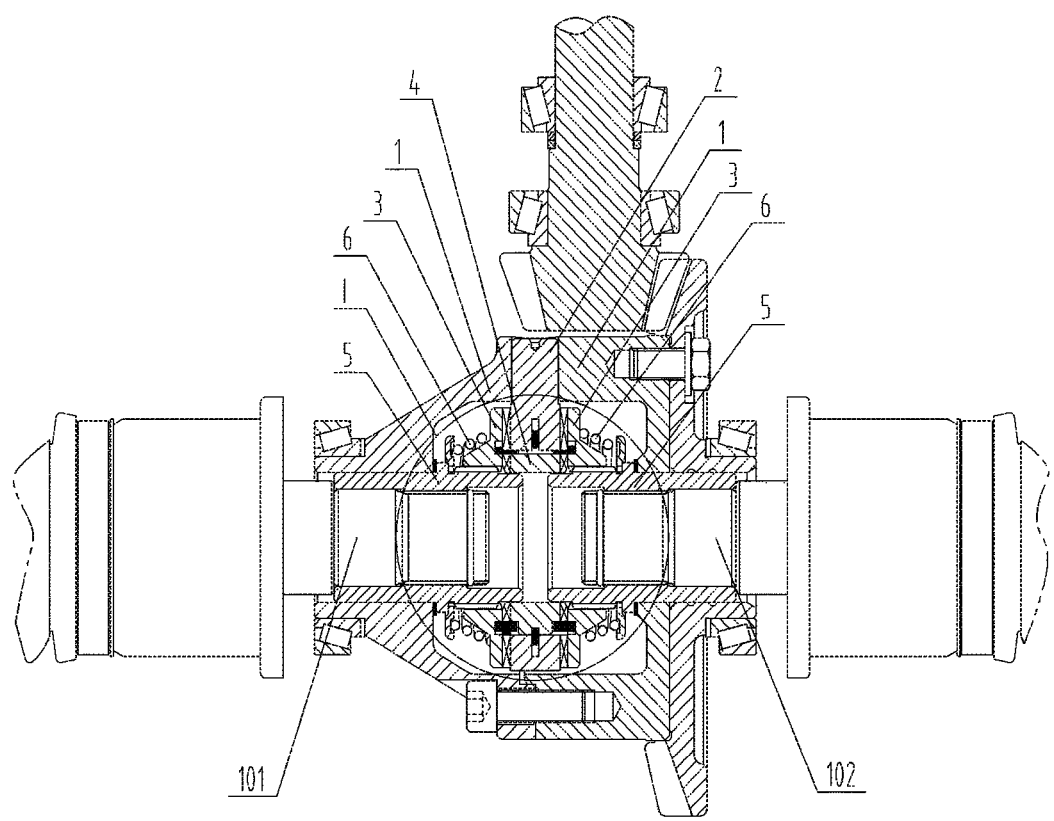
FIG. 2 is a schematic view showing the structure of an embodiment of a transmission mechanism according to the present application.
Figure 3:
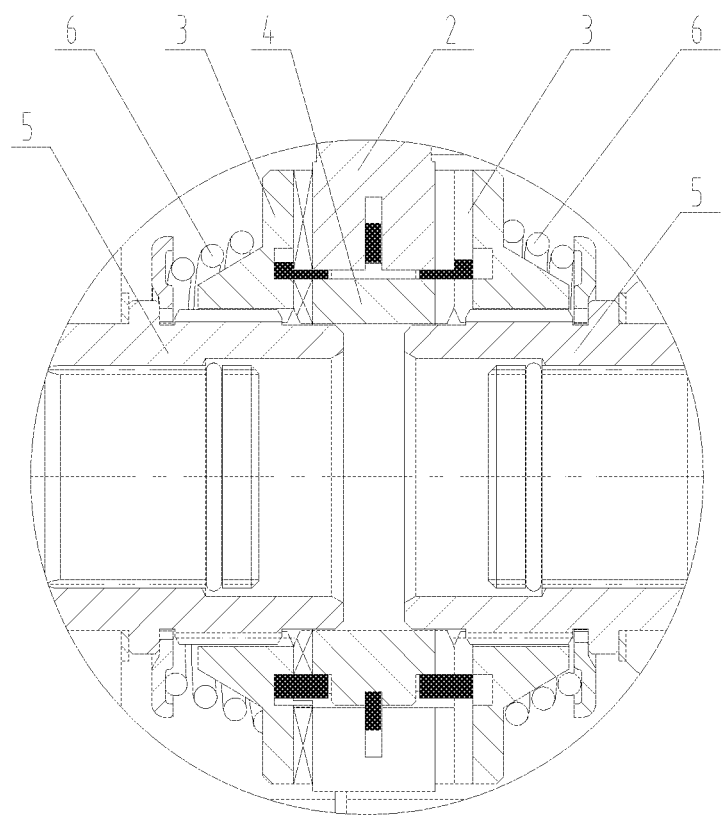
FIG. 3 is a partially enlarged view of part I in FIG. 2.

Reference is made to FIGS. 2 and 3, FIG. 2 is a schematic view showing the structure of an embodiment of a transmission mechanism according to the present application, and FIG. 3 is a partially enlarged view of part I in FIG. 2.

In an embodiment, as shown in FIG. 2, a transmission mechanism of an all-terrain vehicle is provided according to the present application. The transmission mechanism includes an axle, and the axle includes a left driving half-axle and a right driving half-axle. A jaw differential is further provided at a joint of the left driving half-axle and the right driving half-axle. The jaw differential allows the left driving half-axle and the right driving half-axle to rotate at the same speed when a vehicle travels in a straight line. When the vehicle turns a corner, a wheel at one side has a tendency of rotating fast under the effect of a friction from the ground, and the jaw differential can automatically allow the wheel at the side required to rotate fast to rotate timely and appropriately as required. When the vehicle runs in a complex road condition and a wheel at one side is suspended in the air, the jaw differential can guarantee that a wheel at one side on ground always maintains a driving force, and the wheel at the side suspended in the air also rotates at the same speed as the wheel at the side on the ground. When the vehicle returns to running in the straight line, the left driving half-axle and the right driving half-axle return to rotating at the same speed.

In a specific solution, as shown in FIG. 3, the jaw differential includes casings 1, a drive ring 2, driven rings 3, a central ring 4 and half-axle gears 5. The drive ring 2 is fixedly connected between a left casing 1 and a right casing 1. The central ring 4 is nested and connected inside the drive ring 2. From a left side and a right side of the drive ring 2 and the central ring 4, the drive ring 2 and the central ring 4 nested together, the driven rings 3 and the half-axle gears 5 are connected in the listed sequence. An outer end surface of each of the driven rings 3 is provided with two circles of teeth. Outer circle teeth are meshed with the drive ring 2 by inverted trapezoidal gear teeth, and inner circle teeth are meshed with the central ring 4 by trapezoidal gear teeth. Further, a large clearance is kept between gear teeth of the drive ring 2 and gear teeth of each of the driven rings 3, and no clearance exists between gear teeth of the central ring 4 and the gear teeth of each of the driven rings 3.

When the vehicle travels in a straight line, there is no speed difference between the wheels at two sides. The drive ring 2, through a main transmission meshing pair formed by the drive ring 2 and each of the driven rings 3, transmits power in turn to a left driven ring 3 and a right driven ring 3, and further to a left half-axle gear 5 and a right half-axle gear 5 and finally to a left half-axle 101 and a right half-axle 102. Locking between the drive ring 2 and each of the driven rings 3 by the inverted trapezoidal teeth are reliable, and allows the driving force to be distributed to the left side and the right side as required. In this case, an auxiliary transmission meshing pair formed by the central ring 4 and each of the driven rings 3 is in a state of non-contact.

When the vehicle turns a corner, and a wheel at one side has a tendency of rotating fast under the effect of friction from the ground, and the wheels at the left side and the right side begin to rotate at different rotating speeds, the wheel at an outer side rotates fast, and the wheel at an inner side rotates slowly. The driven ring 3 at the side where the wheel rotates fast has a tendency of rotating fast, therefore, the driven ring 3 rotates with respect to the drive ring 2 to allow the main meshing pair to disengage, and further drives the central ring 4 to rotate to a limit position to allow the auxiliary meshing pair that is separated to enter into a meshed state. That is, trapezoidal teeth of the driven ring 3 are meshed with the central ring 4, to drive the driven ring 3 to move with respect to the central ring 4 on an inclined plane, and then the driven ring 3 slides out of the meshing teeth of the central ring 4, and the wheel at the outer side spins, thus achieving the differential effect. The wheel at the side rotating slowly always maintains a constant driving torque. At this time, the driven ring 3 only transmits a small part of torque, thus, the slipping and rubbing of teeth surfaces of the entire vehicle are avoided, noise is reduced and the service life of the tooth surfaces is improved.

When the vehicle runs in a complex road condition and a wheel at one side is suspended in the air, the wheel at the side on the ground always maintains the driving force, and since the wheel suspended in the air is not applied with an external force, the driven ring 3 at the side suspended in the air does not have a tendency of rotating fast, and the wheel at the side suspended in the air also rotates at the same speed as the wheel at the side on the ground, thus the wheels at the two sides rotate at the same speed.

When the vehicle returns to normal running, and the speed differential disappears, the auxiliary meshing pair are disengaged, and the driven ring 3 is reset and is meshed with the drive ring 2 again to form the main meshing pair, and the left and right inverted trapezoidal gear teeth are meshed and locked, such that the left driving torque and the right driving torque are redistributed uniformly.

As can be seen from the above working process, for the all-terrain vehicle which travels on a road with a complex condition, with adoption of the jaw differential with such a structure, side tipping, side slipping, and tire scuffing are not apt to occur and the tire maintains to travel in the form of rolling when the vehicle turns a corner, thus, the vehicle gets rid of a stuck condition such as slipping, and the working reliability of the all-terrain vehicle is greatly improved.

Figure 4:
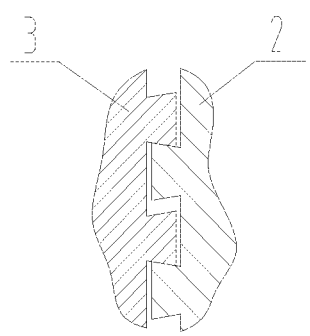
FIG. 4 is a schematic view showing the structure of a part where a drive ring is meshed with a driven ring.
Figure 5:
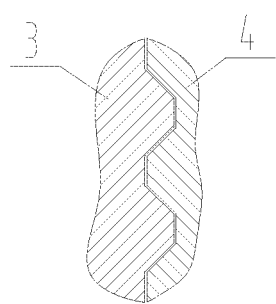
FIG. 5 is a schematic view showing the structure of a part where a central ring is meshed with the driven ring.

Reference is made to FIGS. 4 and 5, FIG. 4 is a schematic view showing the structure of a part where the drive ring 2 is meshed with the driven ring 3; and FIG. 5 is a schematic view showing the structure at a part where the central ring 4 is engaged with the driven wheel 3.

Specifically, as shown in FIG. 4, the above drive ring 2 and driven ring 3 are meshed with each other by inverted trapezoidal gear teeth with a large meshing clearance between meshed gear teeth, and the inverted trapezoidal shape has a small gradient, and is capable of transmitting force reliably. As shown in FIG. 5, the above central ring 4 and the driven ring 3 are meshed with each other by trapezoidal gear teeth with no meshing clearance existing between meshed gear teeth, and the trapezoidal shape has a large gradient, which allows the driven wheel 3 to slide out easily to disengage from the central ring 4 in a differential state.

In a further solution, an outward thrust ring is further provided between the drive ring 2 and each of the driven rings 3.

The outward thrust ring can restrict the driven rings 3 from an outer side, and prevent the driven rings 3 from generating noise due to sliding out and being reset frequently in the differential sate, and can reduce abrasion between the teeth in contact of the drive ring 2 and the driven rings 3.

In a further solution, the above drive ring 2 and the central ring 4 are connected as a whole by a snap ring.

The snap ring can simply and conveniently connect the drive ring 2 and the central ring 4 as a whole. Of course, the drive ring 2 and the central ring 4 may be connected as a whole by other manners, for example, by bolt connection or rivet connection.

Furthermore, a spring reset mechanism is provided between the half-axle gear 5 and the driven ring 3, and the spring reset mechanism includes a spring 6 and a retainer ring.

In this way, when the vehicle returns to normal running after turning a corner, and the differential speed is less than a certain value, the spring 6 can push the driven ring 3 to reset, to allow the left and right inverted trapezoidal transmission teeth to be meshed again, and the driving force to be redistributed as required.

Furthermore, an all-terrain vehicle is further provided according to the present application, which includes an engine and a transmission mechanism connected to the engine; and the transmission mechanism adopts the transmission mechanism described above.

Since the transmission mechanism has the above technical effects, the all-terrain vehicle including the transmission mechanism should also have the same technical effects, which are not described here.

The all-terrain vehicle and the transmission mechanism thereof according to the present application are described in detail hereinbefore. The principle and the embodiments of the present application are illustrated herein by specific examples. The description of the above embodiments is only intended to facilitate the understanding of the method and the concept of the present application. It should be noted that, for those skilled in the art, many improvements and modifications may be made to the present application without departing from the principle of the present application, and these improvements and modifications are also deemed to fall into the protection scope of the present application defined by the claims.

The invention claimed is:

1. A transmission mechanism of an all-terrain vehicle, comprising an independent suspension axle, the independent suspension axle comprising a left driving half-axle and a right driving half-axle, wherein
   a jaw differential is further provided at a joint of the left driving half-axle and the right driving half-axle and is configured to:
   allow the left driving half-axle and the right driving half-axle to rotate at a same speed when the vehicle travels in a straight line;
   allow a wheel at one side which rotates fast to rotate timely and appropriately as required when the vehicle turns a corner;
   allow a wheel at one side on the ground to always maintain a driving force, and a wheel at another side suspended in air to rotate at a same speed as the wheel at one side on the ground when the wheel at another side of the vehicle is suspended in the air; and
   allow the left driving half-axle and the right driving half-axle to return to the same rotating speed when the vehicle returns to running in a straight line, wherein
   the jaw differential comprises a left casing and a right casing, a drive ring, driven rings, a central ring and half-axle gears;
   the drive ring is fixedly connected between the left casing and the right casing, and the central ring is nested and connected inside the drive ring;
   from a left side and a right side of the drive ring and the central ring, the drive ring and the central ring nested together, the driven rings and the half-axle gears are connected in the listed sequence; and
   an outer end surface of the driven ring is provided with two circles of teeth, outer circle teeth are configured to mesh with the drive ring by inverted trapezoidal gear teeth with a meshing clearance existing between meshed gear teeth, and inner circle teeth are configured to mesh with the central ring by trapezoidal gear teeth with no meshing clearance existing between meshed gear teeth.

2. The transmission mechanism according to claim 1, wherein an outward thrust ring is further provided between the drive ring and each of the driven rings.

3. The transmission mechanism according to claim 2, wherein the drive ring and the central ring are connected as a whole by a snap ring.

4. The transmission mechanism according to claim 3, wherein a reset spring is provided between the half-axle gear and each of the driven rings.

5. An all-terrain vehicle, comprising an engine and a transmission mechanism connected to the engine, wherein the transmission mechanism is the transmission mechanism according to claim 1.

6. An all-terrain vehicle, comprising an engine and a transmission mechanism connected to the engine, wherein the transmission mechanism is the transmission mechanism according to claim 1.

* * * * *